(12) United States Patent
Prescott et al.

(10) Patent No.: US 10,724,375 B2
(45) Date of Patent: Jul. 28, 2020

(54) GAS TURBINE ENGINE WITH RING DAMPER

(71) Applicant: General Electric Company, Schenectady, NY (US)

(72) Inventors: Jeffrey Miles McMillen Prescott, Somerville, MA (US); Richard Alan Wesling, Cincinnati, OH (US); Peter Andrew Simeone, Byfield, MA (US)

(73) Assignee: General Electric Company, Schenectady, NY (US)

( * ) Notice: Subject to any disclaimer, the term of this patent is extended or adjusted under 35 U.S.C. 154(b) by 1035 days.

(21) Appl. No.: 15/042,187

(22) Filed: Feb. 12, 2016

(65) Prior Publication Data
US 2017/0234133 A1    Aug. 17, 2017

(51) Int. Cl.
| | |
|---|---|
| F01D 5/10 | (2006.01) |
| F16F 15/14 | (2006.01) |
| F01D 11/00 | (2006.01) |
| F01D 5/12 | (2006.01) |
| F01D 9/04 | (2006.01) |
| F01D 25/04 | (2006.01) |
| F04D 29/32 | (2006.01) |
| F04D 29/66 | (2006.01) |

(52) U.S. Cl.
CPC ............. *F01D 5/10* (2013.01); *F01D 5/12* (2013.01); *F01D 9/041* (2013.01); *F01D 11/001* (2013.01); *F01D 25/04* (2013.01); *F04D 29/321* (2013.01); *F04D 29/668* (2013.01); *F16F 15/14* (2013.01); *F05D 2220/32* (2013.01); *F05D 2260/96* (2013.01); *Y02T 50/672* (2013.01)

(58) Field of Classification Search
CPC ..... F01D 5/10; F01D 5/12; F01D 5/26; F01D 9/041; F01D 25/04; F01D 29/321; F01D 29/668; F01D 11/001; F05D 2220/32; F05D 2260/96; F16F 15/14; F04D 29/321; F04D 29/668; Y02T 50/672
See application file for complete search history.

(56) References Cited

U.S. PATENT DOCUMENTS

| | | | |
|---|---|---|---|
| 2,664,240 A | 12/1953 | Gorton | |
| 2,956,774 A * | 10/1960 | Stalker | F01D 5/10 416/210 A |
| 3,080,771 A * | 3/1963 | Baldwin | F16F 15/129 295/7 |
| 4,192,633 A * | 3/1980 | Herzner | F01D 5/10 415/119 |
| 4,254,985 A * | 3/1981 | Kirschner | B60B 17/0027 295/6 |

(Continued)

FOREIGN PATENT DOCUMENTS

EP    1 180 579 A2    2/2002

OTHER PUBLICATIONS

Extended European Search Report and Opinion issued in connection with corresponding EP Application No. 16202431.9 dated Apr. 6, 2017.

*Primary Examiner* — Moshe Wilensky
*Assistant Examiner* — Joshua R Beebe
(74) *Attorney, Agent, or Firm* — Dinsmore & Shohl LLP (57) ABSTRACT

A damper seat for a ring damper that redirects axial loads and is disposed within a gas turbine engine with at least one disk rotatable about a rotational axis and having a disk neutral axis extending radially from the rotational axis.

25 Claims, 5 Drawing Sheets

(56) References Cited

U.S. PATENT DOCUMENTS

| | | | | |
|---|---|---|---|---|
| 4,361,213 | A | * 11/1982 | Landis, Jr. | F01D 11/02 |
| | | | | 188/378 |
| 4,817,455 | A | 4/1989 | Buxe | |
| 5,201,850 | A | * 4/1993 | Lenhardt | F01D 5/10 |
| | | | | 416/190 |
| 5,527,079 | A | * 6/1996 | Catot | B60B 17/00 |
| | | | | 295/31.1 |
| 5,733,103 | A | * 3/1998 | Wallace | F01D 5/10 |
| | | | | 416/248 |
| 6,375,428 | B1 | * 4/2002 | Stangeland | F01D 5/10 |
| | | | | 416/190 |
| 6,494,679 | B1 | * 12/2002 | Gadre | F01D 5/24 |
| | | | | 416/145 |
| 7,806,410 | B2 | 10/2010 | El-Aini et al. | |
| 8,070,435 | B1 | 12/2011 | Eng | |
| 8,118,540 | B2 | 2/2012 | Cloarec | |
| 8,197,189 | B2 | 6/2012 | Bonniere et al. | |
| 8,226,367 | B2 | * 7/2012 | Baumhauer | F01D 5/10 |
| | | | | 416/229 R |
| 8,529,197 | B1 | 9/2013 | Coffin et al. | |
| 2009/0214347 | A1 | * 8/2009 | Cloarec | F01D 5/10 |
| | | | | 416/204 A |
| 2013/0004313 | A1 | * 1/2013 | El-Aini | F01D 5/10 |
| | | | | 416/134 R |
| 2013/0156584 | A1 | 6/2013 | Anderson et al. | |
| 2013/0259655 | A1 | 10/2013 | Coffin et al. | |
| 2014/0341728 | A1 | 11/2014 | Cloarec et al. | |

\* cited by examiner

GAS TURBINE ENGINE WITH RING DAMPER

STATEMENT REGARDING FEDERALLY SPONSORED RESEARCH OR DEVELOPMENT

This invention was made with government support under Contract No. W911W6-11-2-0009 awarded by the United States Government. The United States Government has certain rights in this invention.

BACKGROUND OF THE INVENTION

Turbine engines, and particularly gas or combustion turbine engines, are rotary engines that extract energy from a flow of combusted gases passing through a fan with a plurality of blades, then into the engine through a series of compressor stages, which include pairs of rotating blades and stationary vanes, through a combustor, and then through a series of turbine stages, which include pairs of rotating blade and stationary vanes. The rotating blades are supported by disks between which interstage seals can be placed.

During operation the rotating interstage seal or disk can interact with both static seals (mechanical interaction) and air cavities (acoustic interaction), resulting in vibratory stress of the part, which is undesirable. Channels are designed specifically to hold dampers to dampen these vibrations, in particular the radial movement of the disk caused by centrifugal forces on the disk as it rotates. Dampers that compensate for axial vibrations are also necessary as these vibrations occur in rotating seals as well.

BRIEF DESCRIPTION OF THE INVENTION

In an aspect, the invention relates to a gas turbine engine comprising at least one disk rotatable about a rotational axis and having a disk neutral axis extending radially from the rotational axis, a ring damper, a radial channel formed in one of the disk and ring damper and having a damper neutral axis extending radially from the rotational axis and axially spaced from the disk neutral axis, a damper seat formed by the radial channel having a profile that axially redirects at least a portion of a centrifugal load of the ring damper, and a slipping portion that is integral with the damper seat and ring damper, wherein one of the disk and ring damper is seated within the damper seat.

In another aspect, the invention relates to a gas turbine engine comprising at least one disk rotatable about a rotational axis and having a disk neutral axis extending radially from the rotational axis, a radial channel having a damper neutral axis extending radially from the rotational axis and axially spaced from the disk neutral axis, a ring damper, and a damper seat having a profile shaped such that the ring damper is seated resulting in a differential strain applied to the channel on opposite sides of the ring damper in response to a centrifugal load from the ring damper.

In another aspect, the invention relates to a method of damping a centrifugal load on a disk in a gas turbine engine comprising moving a ring damper along a ramp surface of a radial channel while maintaining the ring damper spaced from an apex of the channel.

In another aspect, the invention relates to a ring damper assembly comprising, a ring damper about a rotational axis, a radial channel formed in one of the ring damper and a disk and having a damper neutral axis extending radially from the rotational axis and axially spaced from the disk neutral axis, a damper seat formed by the radial channel having a profile that axially redirects at least a portion of a centrifugal load of the ring damper, and a slipping portion that is integral with the damper seat and ring damper, wherein one of the disk and ring damper is seated within the damper seat.

DESCRIPTION OF EMBODIMENTS OF THE INVENTION

The described embodiments are directed to the geometry of a damper seat formed by a radial channel in a ring seal of a gas turbine engine. For purposes of illustration, the present invention will be described with respect to an aircraft gas turbine engine. It will be understood, however, that the invention is not so limited and may have general applicability in non-aircraft applications, such as other mobile applications and non-mobile industrial, commercial, and residential applications.

Figure 1:
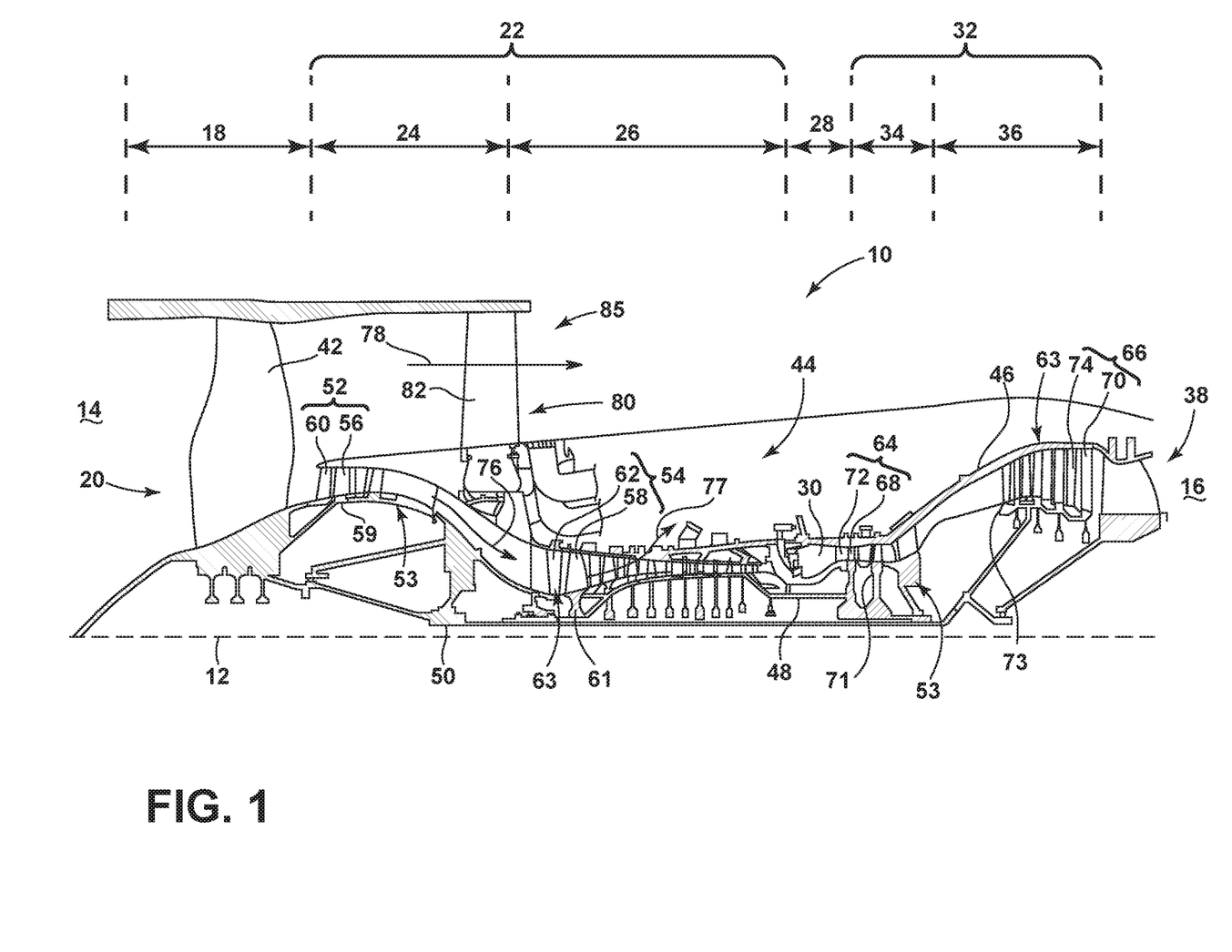
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending rotational axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 53, 53.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 59, which is mounted to the corresponding one of the HP and LP spools 48, 50, with each stage having its own disk 59, 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding rotating blades 68, 70 are positioned upstream of and adjacent to the static turbine vanes 72, 74. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having its own disk 71, 73. The vanes 72, 74 for a stage of the compressor can be mounted to the core casing 46 in a circumferential arrangement.

The portions of the engine 10 mounted to and rotating with either or both of the spools 48, 50 are also referred to individually or collectively as a rotor 53. The stationary portions of the engine 10 including portions mounted to the core casing 46 are also referred to individually or collectively as a stator 63.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding rotating blades 68, 70 are positioned upstream of and adjacent to the static turbine vanes 72, 74. It is noted that the number of blades, vanes, and turbine stages shown in FIG. 1 were selected for illustrative purposes only, and that other numbers are possible.

In operation, an airflow enters the fan section 18 and is split such that a portion of the airflow is channeled into the LP compressor 24, which then supplies pressurized ambient air 76 to the HP compressor 26, which further pressurizes the ambient air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26. This fluid can be bleed air 77 which can include air drawn from the LP or HP compressors 24, 26 that bypasses the combustor 30 as cooling sources for the turbine section 32. This is a common engine configuration, not meant to be limiting.

Figure 2:
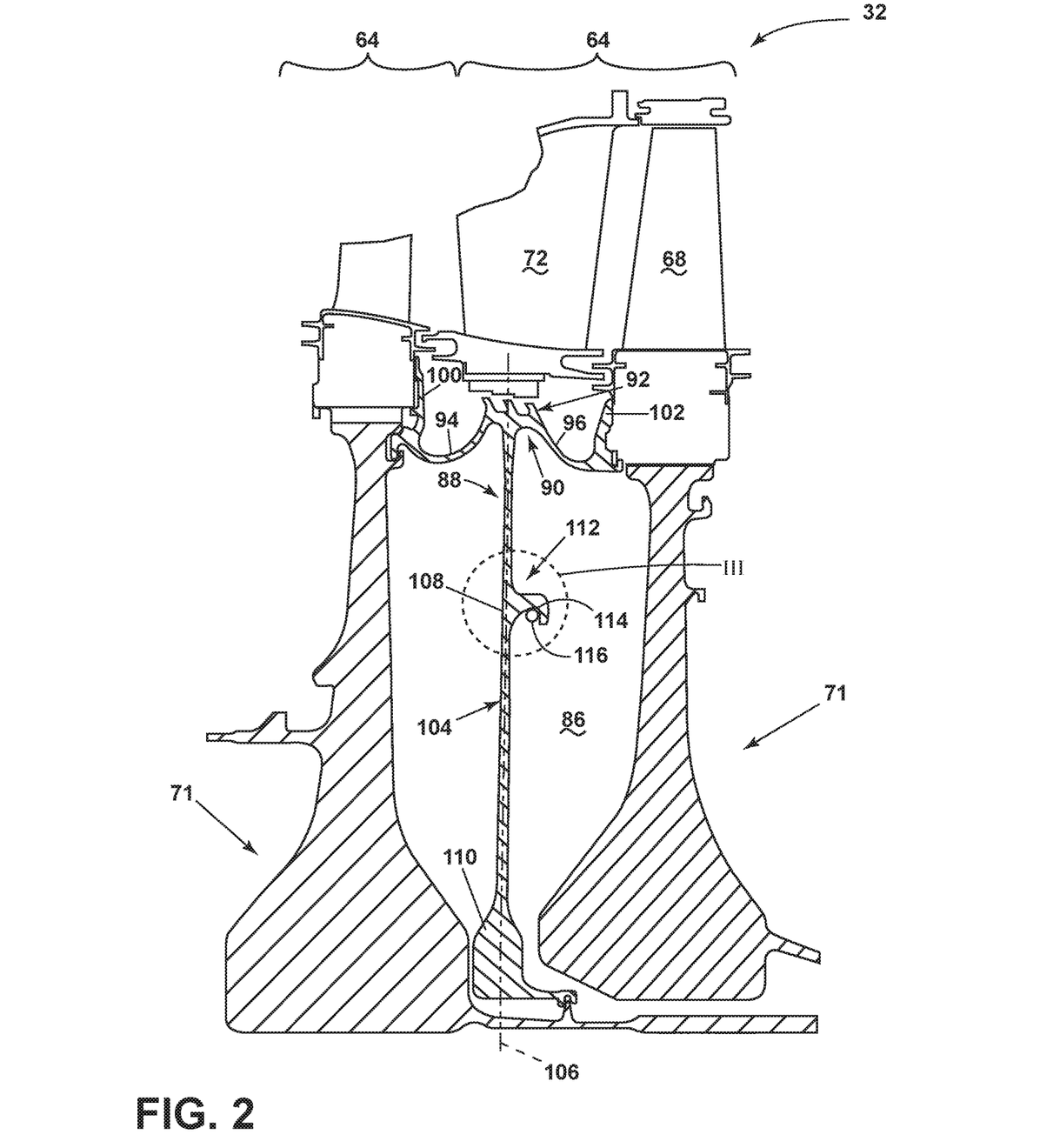
FIG. 2 is an interstage seal with a ring damper.

Referring to FIG. 2, an enlarged view of a turbine section 32 of the turbine engine 10 depicting at least one stage 64 having a corresponding vane 72 and blade 68 where the blades 68 are circumferentially mounted to the corresponding disks 71. A wheel space 86 is formed between consecutive disks 71 where an interstage seal 88 can be placed.

The interstage seal 88 can include an outer shell 90 with a labyrinth seal 92 radially inward of the stationary vane 72. The shell 90 can include a forward arm 94 and an aft arm 96 connecting consecutive stages 64. The forward arm 94 can include a radially extending blade-retaining rim 100 and the aft arm 96 can include an annular peripheral rim 102 together acting as a blade retainer.

The interstage seal 88 further includes a central disk 104 rotatable about the rotational axis 12 and having a disk neutral axis 106 extending radially from the rotational axis 12. The central disk 104 includes a web 108 and terminates in a bore 110. In an exemplary illustration, the disk 104 can include a protrusion 112 extending axially into the wheel space 86 which includes a radial channel 114 in which a ring damper 116 is provided. While illustrated as being within the protrusion 112 of the interstage seal 88, the radial channel 114 can be in any portion of a rotating disk, such as for a labyrinth seal, where the geometry described herein would be beneficial.

Figure 3:
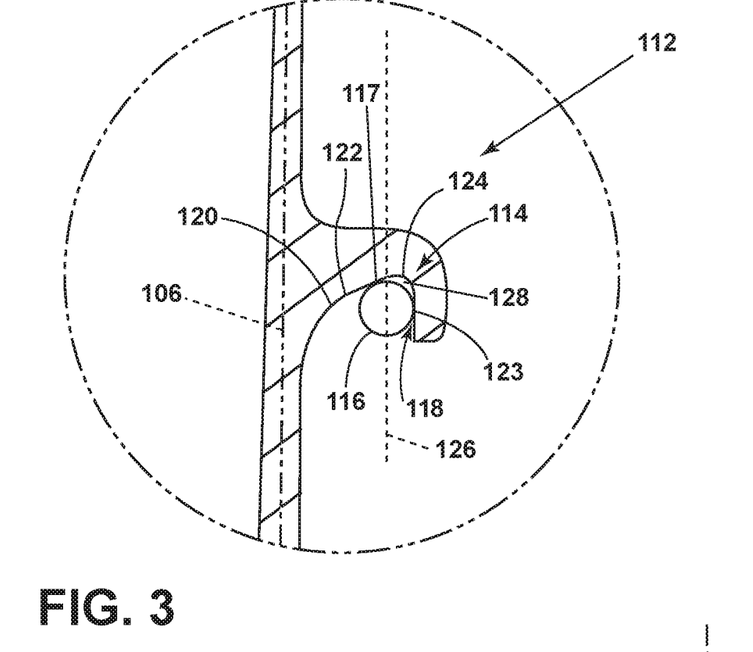
FIG. 3 is close up of a first embodiment of the ring damper of FIG. 2.

Turning to FIG. 3, the geometry of the radial channel 114 is further illustrated. A ring damper 116 is positioned within the radial channel 114 such that a damper neutral axis 126 is axially spaced from the disk neutral axis 106 both extending radially from the rotational axis 12. The radial channel 114 has a profile 120 which forms a damper seat 118. A slipping portion 117 is integral with the ring damper 116 and disk 104 allowing for slipping at the surfaces of the ring damper 116 and disk 104 in contact with each other.

The profile 120 includes a first ramp 122 and a second ramp 123. The first ramp 122 is oriented at an angle relative to the disk neutral axis 106. The second ramp 123 is formed on an axial opposite side of the first ramp 122 parallel to and axially spaced from the damper neutral axis 126 wherein the two ramps come together at an apex 124. The apex 124 is sized such that the ring damper 116 abuts the surface of each ramp 122, 123 leaving a space 128 between the apex 124 and ring damper 116 wherein the ring damper 116 does not abut the apex 124. This space 128 is intentional causing any radial forces to turn into an axial force located at a point where the surface of each ramp 122, 123 abuts the ring damper 116. The asymmetrical positioning of the ring damper 116 also results in a differential strain applied to the channel 114 on opposite sides of the ring damper 116 in response to a centrifugal load from the ring damper 116.

Figure 4:
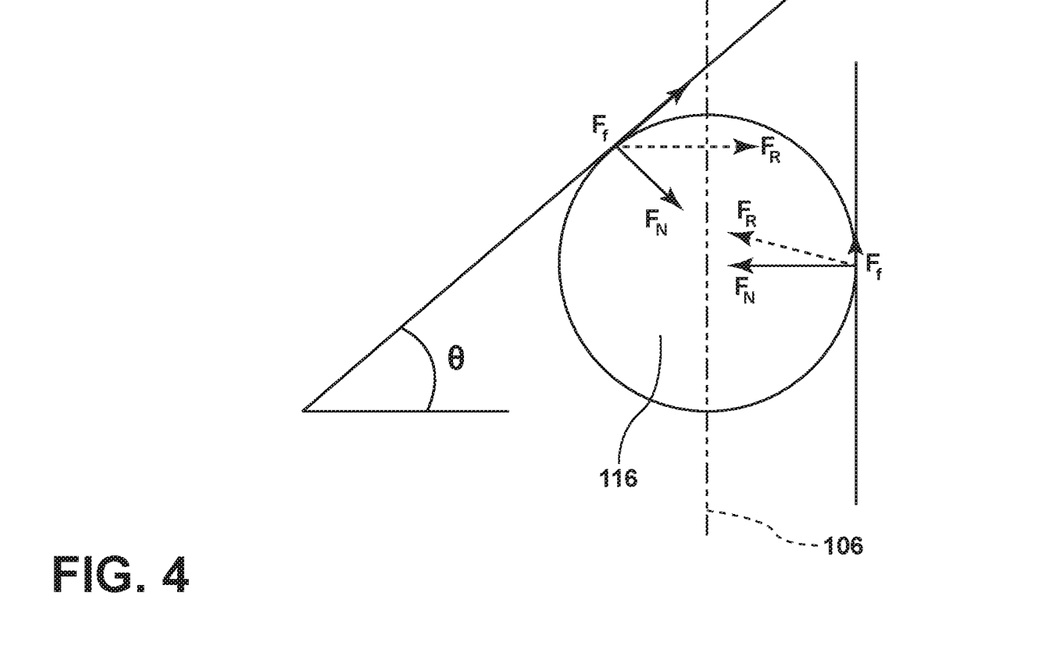
FIG. 4 is a diagram depicting forces on the ring damper of FIG. 2.

The resultant axial force FR on the ring damper is a combination of friction forces $F_f$ and normal forces $F_N$ as shown in FIG. 4. The axial force is the component of $F_R$ that is purely in the axial direction. The friction forces are kinetic as the movement of the ring damper along the ramp surfaces absorbs energy. It is therefore desirable to allow for slipping which influences the angle at which the first ramp can be oriented. The first ramp 122 is oriented at an angle θ with the horizontal which is dependent on the coefficient of kinetic friction μ. Depending on the coefficient of kinetic friction μ of the material of the ramp 122,123 and the ring damper 116 an angle greater or equal to a corresponding θ will cause a lock up between the damper seat 118 and ring damper 116. This angle orientation allows for a redirection of centrifugal ring damper loads in the axial direction and disk energy dissipation as a function of any axial displacement.

The axial force $F_A$ is at a perpendicular orientation to the disk neutral axis 106. Benefits associated with the perpendicular load include a normal force that results in damper strain that is opposite of any disk strain. This forces the damper to scrub against the disk in the circumferential direction and, as a result of friction, dissipate energy from the disk as a function of disk displacement in the axial direction. The dissipation of energy leads to the reduction in disk vibration amplitude and reduces the risk of disk failure due to high cycle fatigue. Each ramp portion 122, 123, undergoes a positive and a negative strain which also contribute to slipping along the slipping portion 117.

Other embodiments of the damper seat are contemplated in FIGS. 5, 6, 7 and 8. The second, third, fourth, and fifth embodiments are similar to the first embodiment, therefore, like parts will be identified with like numerals increasing by 100, 200, 300, 400 respectively, with it being understood that the description of the like parts of the first embodiment applies to the additional embodiments, unless otherwise noted.

Figure 5:
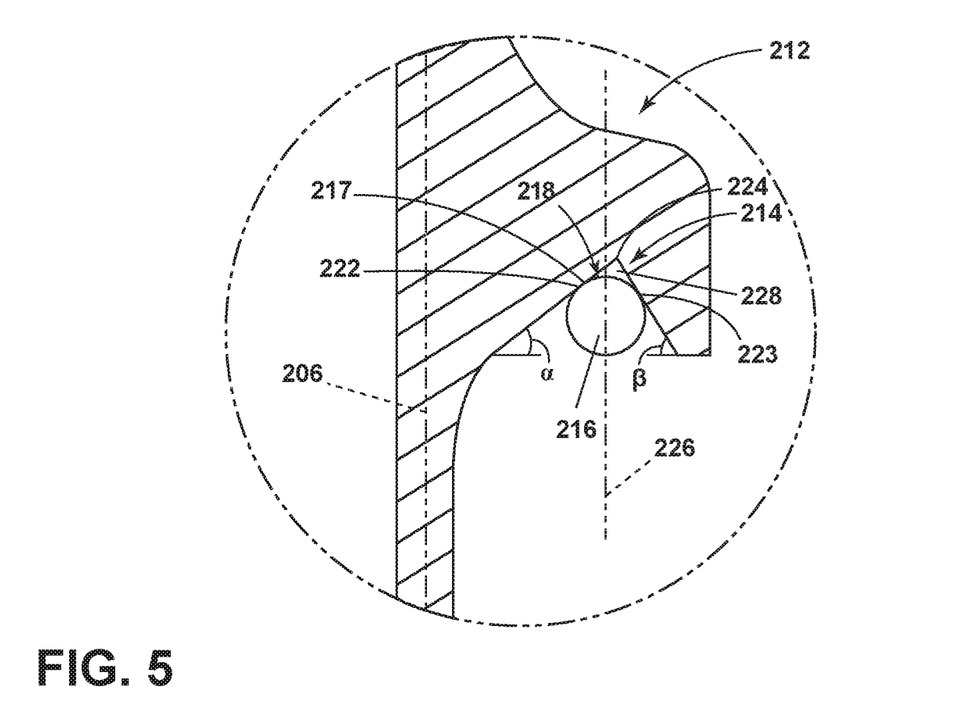
FIG. 5 is a second embodiment of the ring damper of FIG. 2.

FIG. 5 depicts a second embodiment including a first ramp oriented at an angle α and a second ramp oriented at an angle β where β is greater than α. The apex 224 is defined as an inverted V shape 214 opening radially inward where the first and second ramp 222, 223 converge. While depicted as differing angles, α and β could be of the same value. While depicted as a V shaped apex, the apex 224 could be rounded. The space 228 allows for slipping to absorb energy. The space 228 is intentional causing any radial forces to turn into an axial force located at a point where the surface of each ramp 222, 223 abuts the ring damper 216. Each ramp portion 222, 223, undergoes a positive and a negative strain which also contribute to slipping along the slipping portion 217.

Figure 6:
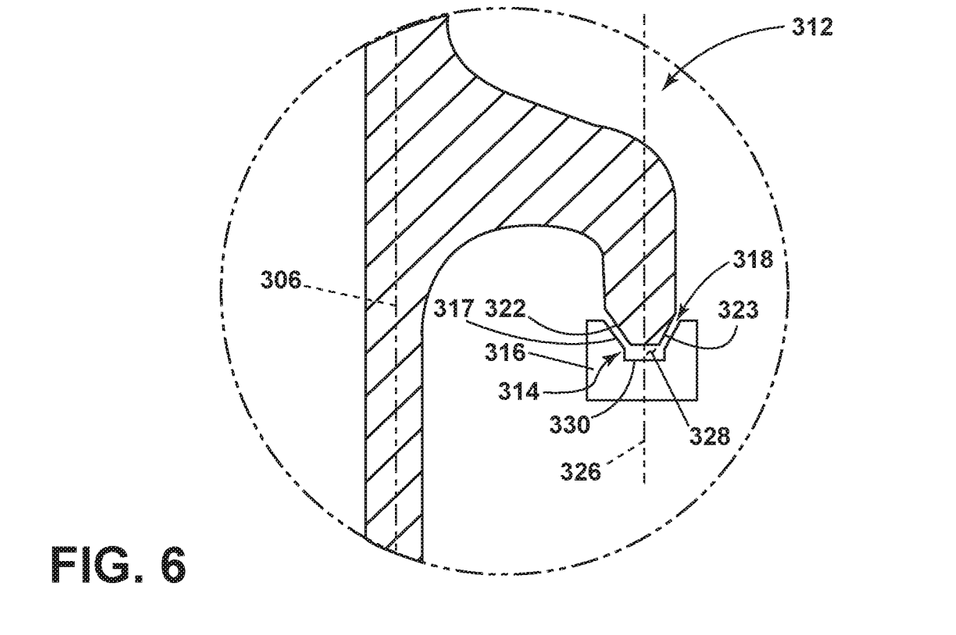
FIG. 6 is a third embodiment of the ring damper of FIG. 2.

FIG. 6 depicts a third embodiment where the first and second ramp 322, 323 surfaces diverge and sit within a channel 314 formed by the ring damper 316 that wraps around the first and second ramp surfaces. Again the space 328 is intentional causing any radial forces to turn into an axial force located at a point where the surface of each ramp 322, 323 abuts the ring damper 316. The portions of the channel 314 in contact with the ramp portions 322, 323, undergoes a positive and a negative strain which also contribute to slipping along the slipping portion 317.

Figure 7:
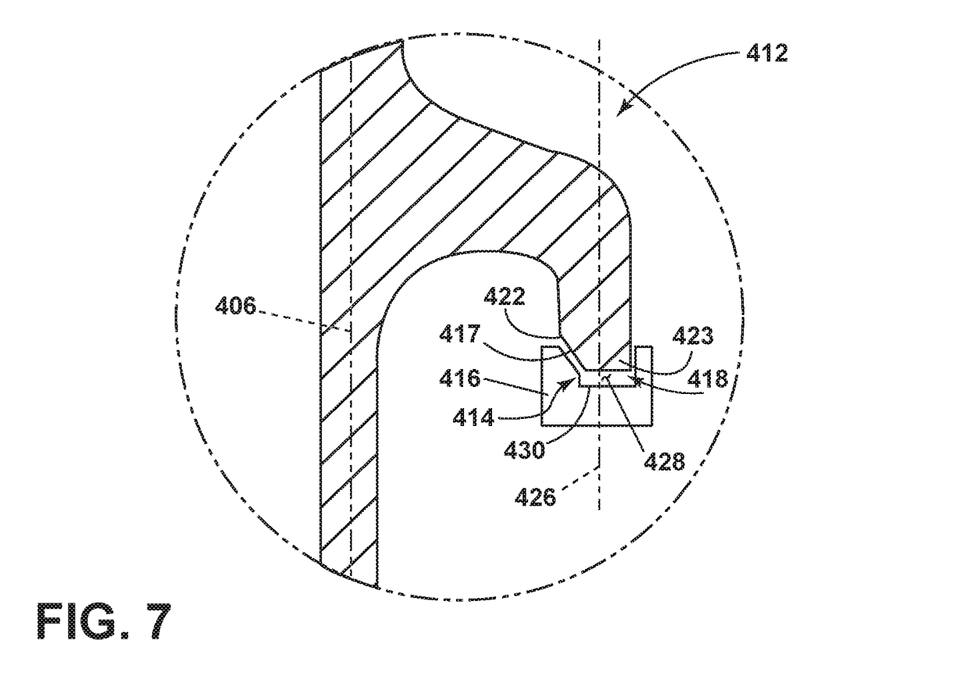
FIG. 7 is a fourth embodiment of the ring damper of FIG. 2.

A fourth embodiment similar to the third embodiment is depicted in FIG. 7. In this embodiment at least one of the ramps 423 is oriented parallel to the damper neutral axis axis 426 while the other ramp 422 remains angled. The ring damper 416 is formed to fit this geometry. Again the space 428 is intentional causing some radial forces to turn into an axial force located at a point where the surface of the ramp 422 abuts the ring damper 416. The portions of the channel 414 in contact with the ramp portions 422, 423 undergoes a positive and a negative strain which also contribute to slipping along the slipping portion 417.

Figure 8:
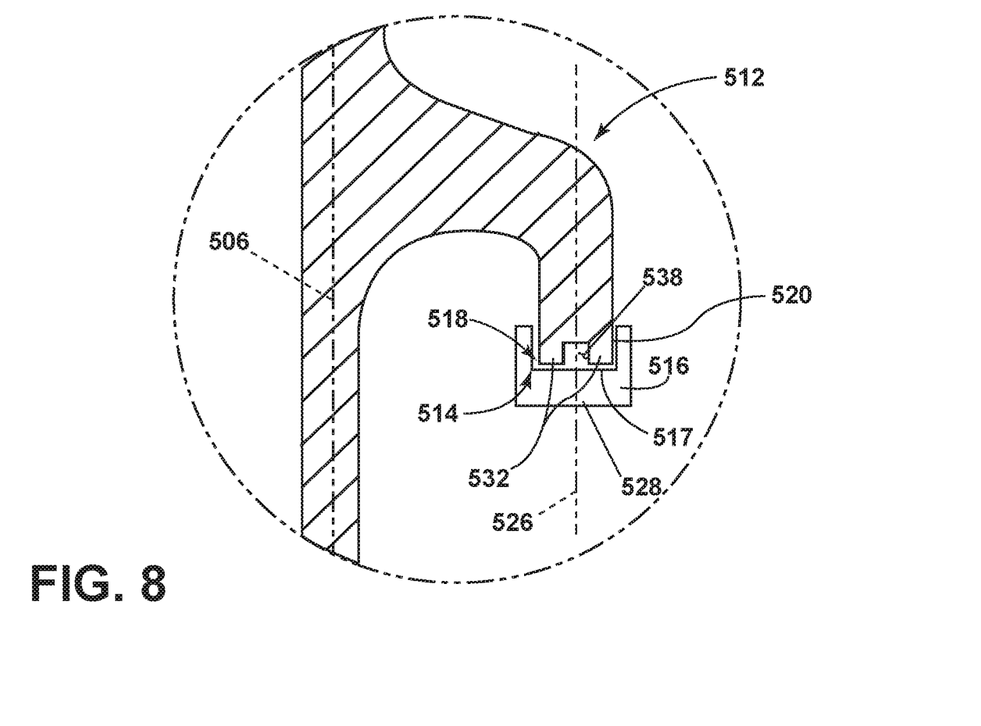
FIG. 8 is a fifth embodiment of the ring damper of FIG. 2.

A fifth embodiment is illustrated in FIG. 8 having a profile 520 comprising a pair of axially spaced stubs 532 and a ring damper 516 has a channel 514 receiving the stubs 532 and having a width greater than the spacing of the stubs. Unlike the aforementioned embodiments, this uses primarily centrifugal loads which translate to normal forces at the surface where the stubs 532 contact the ring damper 516. These normal forces are directly related to the positive and negative strain differentiation which contributes to slipping along the slipping portion 517.

A method of damping a centrifugal load on a disk in a gas turbine engine can include moving the ring damper along the ramp surface of the radial channel while maintaining the space from the apex enabling at least a portion of the centrifugal load acting of the ring damper to transfer to an axial force acting on the ramp.

Benefits for the ring damper include providing a way to reduce the amplitude of axial vibration in rotating disks by redirecting the centrifugal load of a ring damper in the axial direction. The ring damper can be incorporated in numerous configuration variations to capture split-ring dampers in disk designs.

The ring damper can be applied to all rotating disks that experience axial vibration. This design provides energy dissipation as a function of axial displacement rather than axial acceleration, thus creating a more reliable response. The increased reliability of this design can reduce the possibility of high cycle fatigue failure. It is also possible to design a disk damper in a smaller package than previous methods, thus reducing part weight.

Numerical simulations confirm damper effectiveness. A disk with a ring damper has run in multiple compressor rig tests without experiencing failure.

It should be appreciated that application of the disclosed design is not limited to turbine engines with fan and booster sections, but is applicable to turbojets and turbo engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas turbine engine comprising:
   at least one disk rotatable about a rotational axis and having a disk neutral axis extending radially from the rotational axis;
   a ring damper;
   a radial channel formed in one of the disk or the ring damper and having a damper neutral axis extending radially from the rotational axis and axially spaced from the disk neutral axis;
   a damper seat located in only one of the disk or the ring damper and formed by the radial channel having a profile that axially redirects at least a portion of a centrifugal load of the ring damper, the profile having an apex; and
   a slipping portion that is integral with the damper seat and the apex is sized such that the slipping portion does not abut the apex;
   wherein the other one of the disk or the ring damper is seated within the damper seat.

2. The gas turbine engine of claim 1 wherein the profile comprises at least one ramp oriented at an angle relative to the damper neutral axis, with the ramp abutting the slipping portion.

3. The gas turbine engine of claim 2 wherein the profile further comprises an apex extending from the slipping portion.

4. The gas turbine engine of claim 3 wherein the profile further comprises another ramp on an axial opposite side of the apex than the one ramp.

5. The gas turbine engine of claim 4 wherein the other ramp is oriented in an opposite direction than the one ramp.

6. The gas turbine engine of claim 5 wherein the other ramp is oriented at an angle greater than the one ramp.

7. The gas turbine engine of claim 1 wherein the profile has two surfaces on opposite sides of the apex and at least one of the surfaces abuts the slipping portion.

8. The gas turbine engine of claim 7 wherein both surfaces abut the slipping portion.

9. The gas turbine engine of claim 1 wherein the profile has axially spaced first and second ramp surfaces.

10. The gas turbine engine of claim 9 wherein the first and second ramp surfaces converge and the slipping portion is received between the first and second ramp surfaces.

11. The gas turbine engine of claim 10 wherein the profile defines an inverted V shape opening radially inward.

12. The gas turbine engine of claim 9 wherein the first and second ramp surfaces diverge and the ring damper wraps around the first and second ramp surfaces.

13. The gas turbine engine of claim 12 wherein the ring damper comprises the channel in which the first and second ramp surfaces are received.

14. The gas turbine engine of claim 13 wherein the ring damper channel has a bottom spaced from the first and second ramps.

15. The gas turbine engine of claim 1 wherein the at least one disk comprises multiple axially arranged disks.

16. The gas turbine engine of claim 1 wherein the at least one disk comprises one of a compressor rotor disk or a turbine rotor disk.

17. The gas turbine engine of claim 1 wherein the other one of the disk or the ring damper is in contact with the damper seat when seated within the damper seat.

18. A gas turbine engine comprising:
    at least one disk rotatable about a rotational axis and having a disk neutral axis extending radially from the rotational axis;
    a ring damper;
    a radial channel formed in one of the disk or ring damper and having a damper neutral axis extending radially from the rotational axis and axially spaced from the disk neutral axis;
    a damper seat formed by the radial channel having a profile that axially redirects at least a portion of a centrifugal load of the ring damper; and
    a slipping portion that is integral with the damper seat and ring damper;
    wherein one of the disk or ring damper is seated within the damper seat and the profile comprises a pair of axially spaced stubs and the ring damper has a channel receiving the stubs and having width greater than the spacing of the stubs.

19. A gas turbine engine comprising:
    at least one disk rotatable about a rotational axis and having a disk neutral axis extending radially from the rotational axis;
    a radial channel having a damper neutral axis extending radially from the rotational axis and axially spaced from the disk neutral axis;
    a ring damper;
    a damper seat having a profile comprising a pair of ramps where one ramp is oriented at an angle greater than the other ramp and on an axial opposite side of the other ramp forming an apex therebetween; and
    a slipping portion that is integral with the damper seat and ring damper;
    wherein the profile is shaped such that the ring damper is seated resulting in a differential strain applied to the channel on opposite sides of the ring damper in response to a centrifugal load from the ring damper.

20. A method of damping a centrifugal load on a rotating disk in a gas turbine engine comprising:
    moving a ring damper along a pair of ramped surfaces of a radial channel located within a portion of the rotating disk radially inward of an airfoil, the pair of ramped surfaces each angled at differing angles and defining an apex;
    maintaining a space between the ring damper and the apex of the radial channel;
    forming two contact points between the ring damper and the pair of ramped surfaces; and
    redirecting at least a portion of the centrifugal load in the axial direction at the two contact points.

21. The method of claim 20 where at least a portion of a centrifugal load acting on the ring damper results in a differential strain applied to the channel on opposite sides of the ring damper in response to a centrifugal load from the ring damper.

22. A ring damper assembly comprising:
    at least one disk rotatable about a rotational axis and having a disk neutral axis extending radially from the rotational axis;
    a ring damper about the rotational axis;
    a radial channel formed in one of the ring damper or the disk and having a damper neutral axis extending radially from the rotational axis and axially spaced from the disk neutral axis;
    a damper seat located in only one of the disk or the ring damper and formed by the radial channel having a profile that axially redirects at least a portion of a centrifugal load of the ring damper; and a slipping portion that is integral with the damper seat;

wherein the other one of the disk or the ring damper is seated within the damper seat and the profile has an apex sized such that the slipping portion does not abut the apex.

23. The ring damper assembly of claim 22 wherein the profile comprises at least one ramp oriented at an angle relative to the damper neutral axis, with the ramp abutting the slipping portion.

24. The ring damper assembly of claim 23 wherein the one ramp oriented at an angle relative to the damper neutral axis, with the ramp abutting the slipping portion.

25. The ring damper assembly of claim 22 wherein the profile has two surfaces on opposite sides of the apex and at least one of the surfaces abuts the slipping portion.

* * * * *